April 30, 1940.  W. D. BELL  2,198,589

APPARATUS FOR SEALING CONTAINERS

Filed May 2, 1939  3 Sheets-Sheet 1

INVENTOR
William D. Bell.
BY Corser & Mahoney
ATTORNEYS

April 30, 1940.                W. D. BELL                 2,198,589
                    APPARATUS FOR SEALING CONTAINERS
                    Filed May 2, 1939        3 Sheets-Sheet 2

INVENTOR
William D. Bell.
BY
ATTORNEYS

April 30, 1940.  W. D. BELL  2,198,589
APPARATUS FOR SEALING CONTAINERS
Filed May 2, 1939   3 Sheets-Sheet 3

INVENTOR
William D. Bell.
BY
Corbett & Mahoney
ATTORNEYS

Patented Apr. 30, 1940

2,198,589

UNITED STATES PATENT OFFICE 2,198,589

APPARATUS FOR SEALING CONTAINERS

William D. Bell, Columbus, Ohio, assignor to Anchor Hocking Glass Corporation, Lancaster, Ohio, a corporation of Delaware Application May 2, 1939, Serial No. 271,357

10 Claims. (Cl. 226—82)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

One of the objects of my invention is to provide a greatly simplified apparatus for applying and sealing closures on containers and for creating an effective vacuum in the space at the upper end of the container between the closure and the contents of the container which will aid in preventing spoilage of the contents and will also aid in keeping the closure in position on the container.

Another object of my invention is to provide apparatus of the type indicated which is of such a nature that the closure and upper end of the container and the head space between the contents and the closure will be sterilized during the sealing operation.

Another object of my invention is to provide apparatus of the type indicated which will vacuumize and seal the container quickly and effectively.

Another object of my invention is to provide a machine of the type indicated which is of a very simple structure and, therefore, can be built at a relatively low cost, which will occupy a small amount of space, and which is composed of a minimum number of parts tending to wear or become inoperative.

Another object of my invention is to provide a machine of the type indicated which may be adjusted readily to operate upon containers of various sizes.

Another object of my invention is to provide a machine of the type indicated which will automatically adjust itself to containers varying in height to a limited degree.

Another object of my invention is to provide a machine which will be continuous in operation and which will perform its operation without handling of the containers by an operator.

In its preferred form my invention contemplates the provision of a simple apparatus for applying closures to and sealing them on various containers such as jars, bottles, cans, et cetera. The apparatus comprises a continuously moving conveyer upon which the filled containers are placed indiscriminately. The containers are moved by the conveyer to a cap feeding and applying unit where caps or other closures are loosely positioned on the upper ends of the containers. Means is provided in association with the conveyer for centering and maintaining the containers centered on the conveyer. The containers are then moved to a point where a sealing head is disposed. This sealing head is spaced slightly above the upper ends of the containers. At this point, there is also provided means for lifting each container from the conveyer until the cap thereon contacts with the sealing head and the cap is forced into frictional engagement with the upper end of the container. The sealing head is such that it will automatically lift the cap from the upper end of each container, and inject steam into the head space at the upper end of each container to displace the air therefrom, both of these operations being performed substantially simultaneously just prior to the sealing of the cap on the container. After the cap is sealed on the container, the steam previously injected into the head space of the container will condense, creating an effective vacuum within the container which will aid in holding the cap in position and will also aid in preventing spoilage of the contents of the container.

Various other objects and advantages will be apparent from the following description.

The preferred embodiment of my invention is illustrated in the accompanying drawings wherein similar characters of reference designate corresponding parts and wherein.

Figure 1:
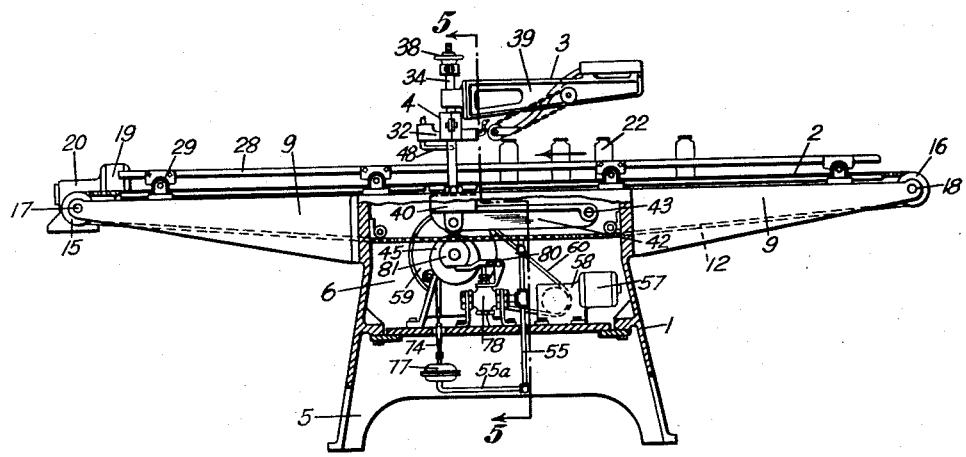
Figure 1 is a view partly in longitudinal vertical section and partly in side elevation illustrating a machine constructed according to my invention.

With reference to the drawings, I have illustrated a machine which comprises generally a table 1 supporting a horizontal conveyer unit 2 on its upper end, a cap feeding and applying unit 3, and a sealing head unit 4.

The table 1 may be made of steel or cast iron plates or of other material. It comprises supporting leg portions 5 and an upper housing portion 6. The top of the housing is formed by the top plate 7 of the table. A removable plate 8 is provided at the side of the housing in order to permit access to the interior thereof which is adapted to contain most of the operating mechanism. At each end of the housing adjacent to the top of the table a pair of outwardly projecting supporting beam members 9 are provided. These beam members are spaced apart and have their inner ends suitably secured to table 1. The upper edges of the members 9 are flush with the top plate 7 of the table. The members 9 are adapted to support the conveyer unit 2.

Figure 4:
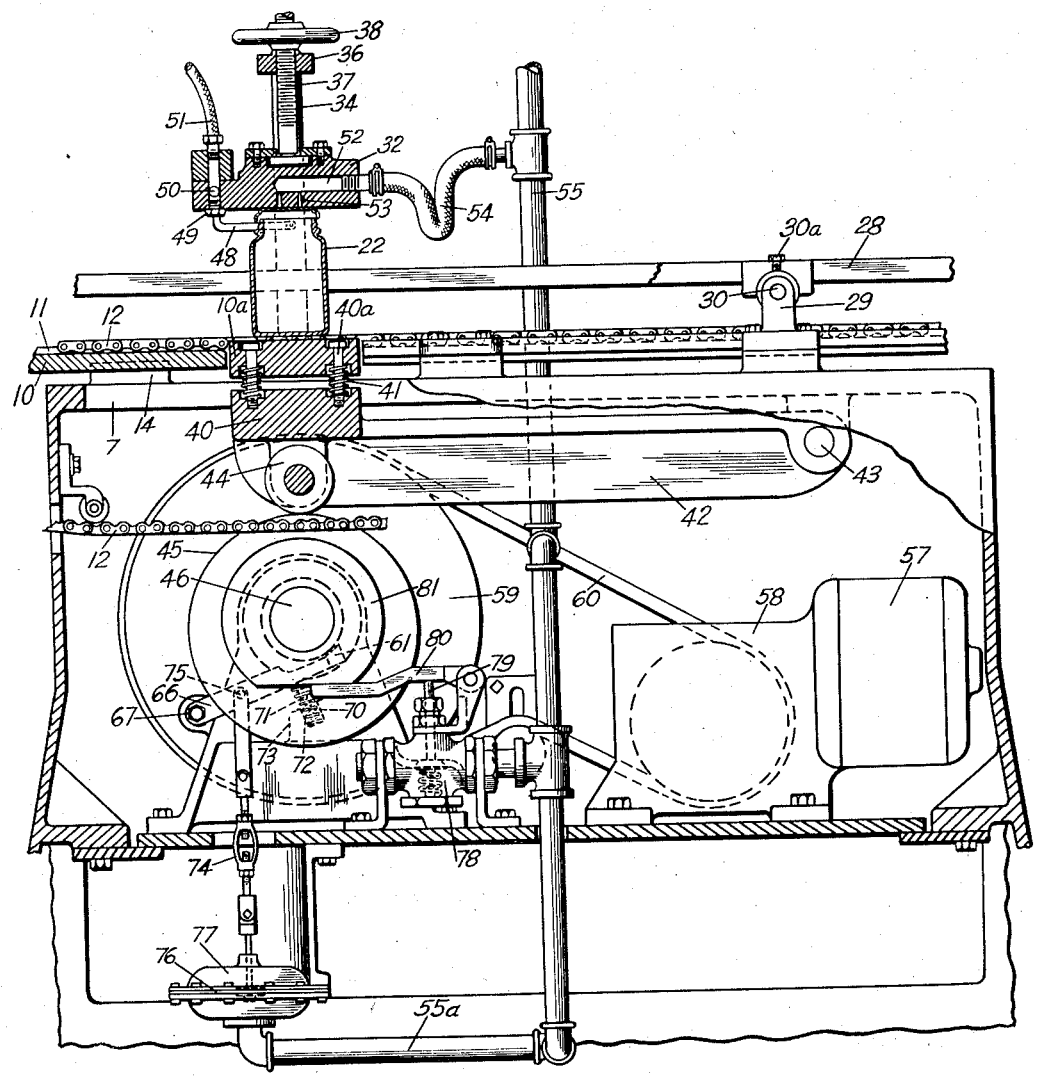
Figure 4 is an enlarged view partly in longitudinal vertical section and partly in side elevation of the main portion of the machine illustrated in Figures 1 and 2.

The conveyer unit 2 comprises a longitudinally extending plate 10 (Figures 1, 2 and 4) which is provided with a pair of longitudinally extending grooves 11 which are parallel with each other and which are adapted to receive the parallel chains 12 of the conveyer. The plate 10 is made in two sections and extends from one end of the machine to the other between the beam members 9. The plate 10 is supported by transverse brackets 14 secured to the upper surface of the top 7 of the table.

The chains 12 are endless sprocket chains and pass around a pair of driving sprockets 15 at one end of the machine and a pair of idler sprockets 16 at the other end of the machine. The sprockets 15 are keyed on a horizontal transverse shaft 17 rotatively mounted in the ends of the pair of beams 9 at that end of the machine. The sprockets 16 are keyed on a transverse shaft 18 rotatively supported in the ends of the beams 9 at that end of the machine. The shaft 17 is driven by an electric motor 19 through a speed reduction gear unit 20, both of which are supported by one of the beams 9 adjacent to the outer end thereof. The conveyer is normally driven continuously by the motor 19. The chains will pass through the grooves 11 formed in the plate 10. As indicated best in Figure 4, the top edge of each chain 12 will project slightly above the top surfaces of the plate 10. Thus, articles placed on the conveyer will be supported by the pair of chains 12 which are closely adjacent to each other and the bottom of the articles will not contact with the upper surfaces of the plate 10. Furthermore, the upper flights of the chains will slide along the bottoms of the grooves 11 formed in the plate 10. The lower flights of the chains 12 will pass beneath the plate 10 and through an opening 21 formed in each end of the housing 6.

Figure 7:
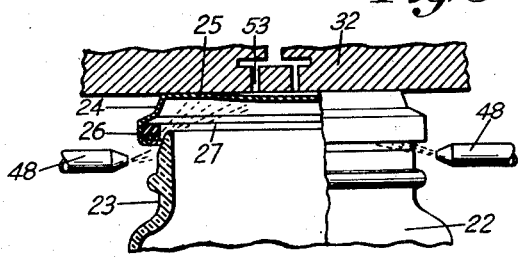
Figure 7 is a view partly in side elevation and partly in section showing the upper portion of the container and showing the cap after it has been lifted into contact with the sealing head.

The containers 22 are placed indiscriminately on the conveyer and are moved in the direction of the arrows (Figure 1) by the conveyer. My invention is not limited to any particular type of container and cooperating cap but for illustrative purposes I have shown in Figure 7 a container which has at its upper end a reduced portion 23 adapted to receive a cap 24. This cap preferably embodies a substantially disk-like portion 25 which has a depending annular skirt 26 which carries an annular gasket 27 therewithin. When the cap is forced downwardly onto the reduced portion 23, the frictional contact of the gasket with the reduced portion of the container will aid in maintaining the cap in position and will seal the cap on the container.

Figure 2:
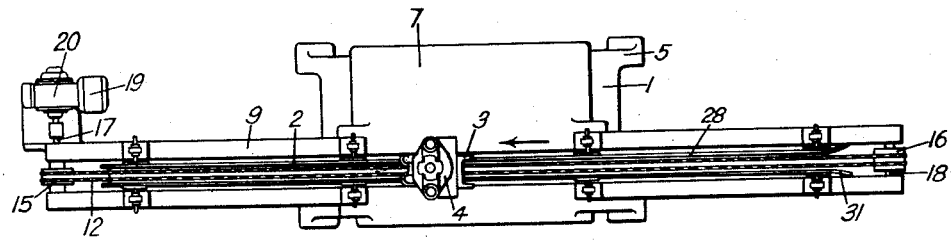
Figure 2 is a top plan view of the structure illustrated in Figure 1.

In order to center the containers transversely of the conveyer and to maintain them centered, I provide a pair of longitudinally extending guide rails 28. Each guide rail 28 is supported adjacent one edge of the conveyer by means of a plurality of longitudinally spaced vertical supports 29. Each support 29 carries at its upper end (Figure 5) a transversely adjustable pin 30 which is connected to the rail 28. Each pin is held in adjusted position by means of a set screw 30a. Thus, it will be apparent that the guide rails 28 may be adjusted towards and from each other to compensate for differences in sizes of the containers upon which this machine may operate. As indicated in Figure 2, at the end of the machine where the containers first enter between the guide rails, these rails are flared outwardly as indicated at 31. Thus, these guide rails will center the containers on the conveyer as they are moved between the rails and will maintain them centered on the conveyer during the various operations performed by the machine.

After the containers are positioned on the conveyer, they are first carried to the cap feeding and applying unit 3. This cap feeding and applying unit may be substantially identical with that disclosed in my co-pending application Serial No. 266,913, filed April 8, 1939. However, the cap feeding and applying means may be of any other suitable type. This unit is of such a type that the lowermost cap will be engaged by a container supported on the conveyer and will be withdrawn from the unit. It will be loosely applied to the upper end of the container.

After the containers pass the unit 3, where the caps are loosely applied thereto, they pass to the sealing head unit 4. This unit is adapted to seal the caps on the containers, to displace the air from the head space and to sterilize such space and the cap before the sealing operation. This sealing head unit is illustrated best in Figures 4 and 5. It comprises a transversely extending plate 32 having a split collar portion 33 formed thereon at each end thereof. This plate is supported by a pair of upstanding posts 34 which pass through the collar portion 33. The posts 34 are supported by the upper plate 7 of the table 1 at each side of the conveyer. A bolt structure 35 is associated with each portion 33 for clamping it to the post 34. A transverse bar 36 is carried immovably on the upper ends of the posts 34. A screw member 37 has its lower end connected to the top of plate 32 and passes upwardly through an opening formed in the member 36. A hand wheel 38 disposed above member 36 cooperates with the threaded portion of member 37. This member 38 bears against member 36. Rotation of member 38 will move the member 37 vertically relative to member 36. This will produce vertical movement of the plate 32 relative to the post 34. During this adjustment, the bolts 35 will be loosened but when the adjustment is completed they will again be tightened. It will be apparent that the plate 32 may be adjusted so that it will be at the proper height depending upon the height of the containers to be sealed. It will also be noted from Figure 1 that the cap feeding and applying unit is carried by an arm 39 which is secured to the plate 32. Thus, when the plate 32 is adjusted in accordance with the height of the container to be sealed, the unit 3 will be adjusted correspondingly at the same time.

In order to seal the caps on the containers, when each container moves beneath the sealing plate 32, the container is raised until the cap contacts with the lower surface of plate 32 and the cap is forced downwardly over the mouth of the container. To accomplish this, I provide means directly below the sealing plate 32 for raising the container from the conveyer and causing the cap thereon to engage plate 32. For this purpose a container supporting platform 10a is associated with the plate 10 directly below the plate 32. This member 10a has grooves 11a (Figure 5) which are deeper than the grooves 11 of plate 10 but are in alignment therewith. The chains 12 will pass through these grooves 11a. The upper surface of the platform 10a is normally flush with the plate 10. This platform is carried upon a member 40. Bolts 40a extend loosely through suitable openings in member 10a and are threaded into the upper surface of member 40. These bolts have compression springs 41 surrounding them which normally maintain the member 10a spaced upwardly from member 40. The member 40 is formed on one end of a lever 42. This lever 42 has its opposite end pivoted to the lower surface of the top plate 7 of the table as at 43. Directly below the member 40, the lever 42 carries a roller 44. This roller 44 engages the edge of a rotatable cam 45. This cam is carried by the end of a shaft 46 which is rotatably mounted in the upper ends of supports 47 and 47a. The cam 45 is of such shape that when it is rotated through one revolution by means of shaft 46, the member 40 and platform 10a will be raised and then lowered. This will lift a container which will be on the conveyer above the platform at this time and will force the cap onto the upper end of the container since the cap will contact with the plate 32. The grooves 11a are deep enough to permit the member 10a to be raised sufficiently without contacting chains 12 to cause the cap to be forced to its final sealed position. The chains 12 will continue to move through the grooves 11a during this operation. When the member 40 moves upwardly the lever 42 which carries it swings about its pivot. Due to the resilient mounting of the platform 10a on member 40 the platform may rock slightly relative to member 40 to compensate for the slight arcuate movement of member 40. Also this resilient mounting will compensate for inequalities in the height of the containers which result during manufacturing due to manufacturing difficulties. The containers will always be contacted with a resilient pressure and crushing of the upper ends of the containers will be precluded. During the sealing operation a portion of member 10a projects above the chains 12. This portion will contact a container carried by the conveyer and will prevent it from moving under the sealing head into contact with the container being sealed.

Figure 5:
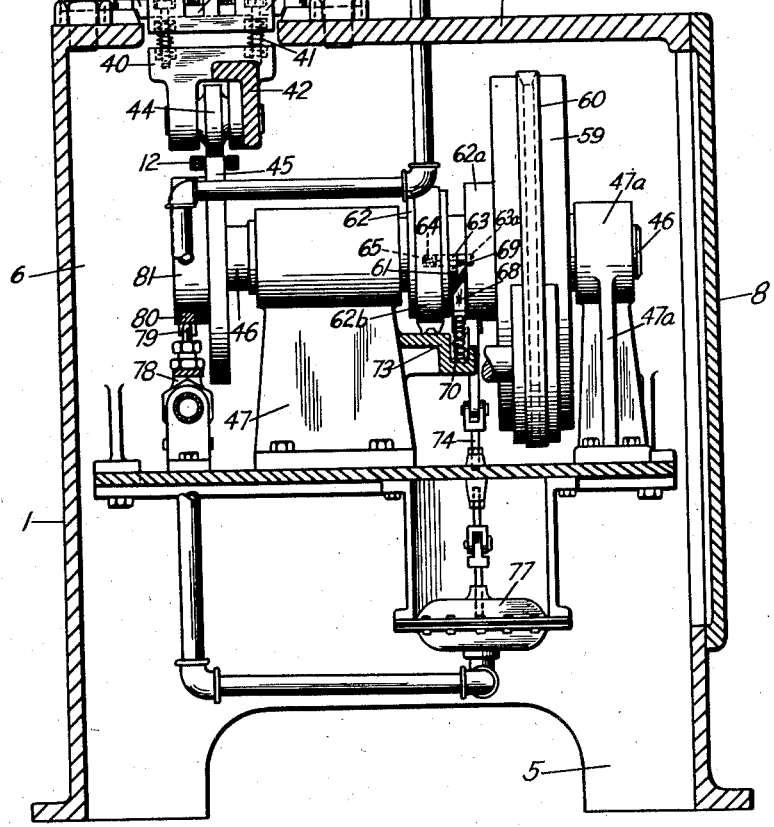
Figure 5 is a transverse vertical sectional view taken substantially along line 5—5 of Figure 1.

The lower surface of the plate 32 carries a pair or steam jets 48 (Figure 5). These steam jets are adapted to inject steam into the upper end of the container to sterilize the head space and the cap and to displace the air from the head space. The members 48 are spaced apart and are so disposed that the upper end of the container moved along by the conveyer will pass between these members in the manner illustrated in Figure 5. These members 48 consist of tubes which are pivotally mounted in plate 32 so that they may be swung towards and away from each other in accordance with variations in sizes of the containers to be sealed by my machine. They are locked in an adjusted position by lock nuts 49. The members 48 are in communication with a steam passageway 50, formed in plate 32 and to which a steam supply conduit is connected. The steam will issue through the jets 48 continuously. I provide means for lifting each cap from the upper end of the container so that the steam can pass into the upper end thereof to perform its sterilizing and evacuating functions.

Figure 3:
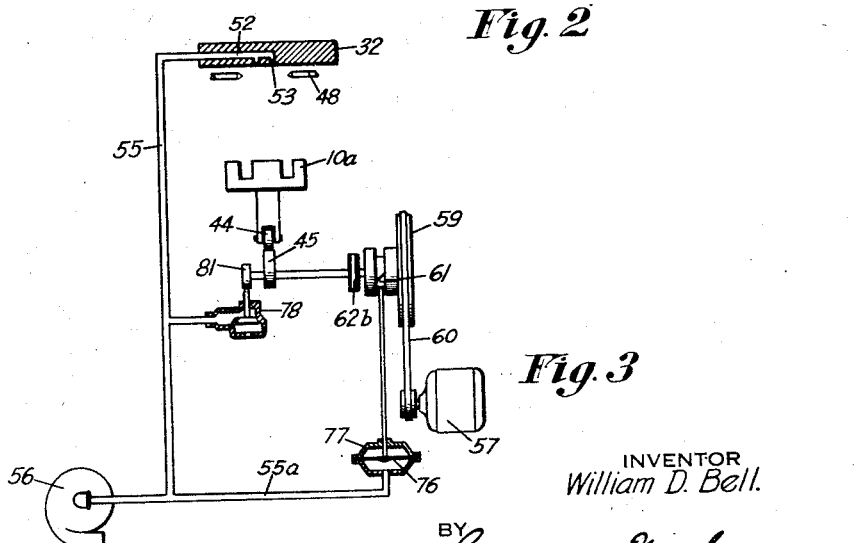
Figure 3 is a diagrammatic view illustrating certain operating parts of my machine.

The means for lifting each cap from the container as it passes under the sealing plate 32 will now be described. For this purpose the plate 32 (Figure 4) is provided with a passageway 52. Openings 53 extend upwardly from the lower surface of plate 32 and have their upper end communicating with passage 52. This passage 52 is connected to a flexible conduit 54. Conduit 54 is connected to a vacuum line 55 which is connected to a vacuum pump 56 (Figure 3). The vacuum pump acts continuously to withdraw the air from the line 55. When a container with a cap loosely thereon moves beneath plate 32 and the openings 53 which are provided at the center thereof, the vacuum force will lift the cap and draw it upwardly into contact with the plate 32 and hold it in this upper position, while permitting it to be moved horizontally by the container, until the container rises and engages the cap in such a manner that it will be sealed thereon. The jar and the cap will be in registry upon elevation of member 10a, because the cap is always moved horizontally with the container 22, even when the cap is lifted into contact with plate 22, (Figure 7), due to the fact that the upper end of the container will always extend within the flange of the cap.

I provide a control system for causing the container lifting mechanism to function each time a container with a cap thereon passes beneath the plate 32. If it happens that the unit 3 does not apply a cap to the container so that when it moves beneath 32 there is no cap thereon, this mechanism will not function to lift the container. Thus, there is no danger of the container lifting mechanism operating to lift a container not having a cap thereon and injuring the upper end of the container by direct contact with the plate 32.

In the housing portion 6 of the table I provide an electric motor 57. This motor 57 drives the speed reduction gear unit 58. The unit 58 drives a fly wheel 59 by means of a belt 60. The fly wheel 59 is carried by the shaft 46 in such a manner that it is free to rotate relative thereto. A clutch unit 61 serves to connect and disconnect the fly wheel 59, which is continuously driven by motor 57, and the shaft 46 which is adapted to be driven at the proper instant in order to rotate cam 45 and cause lifting of the platform 10a.

Figure 6:
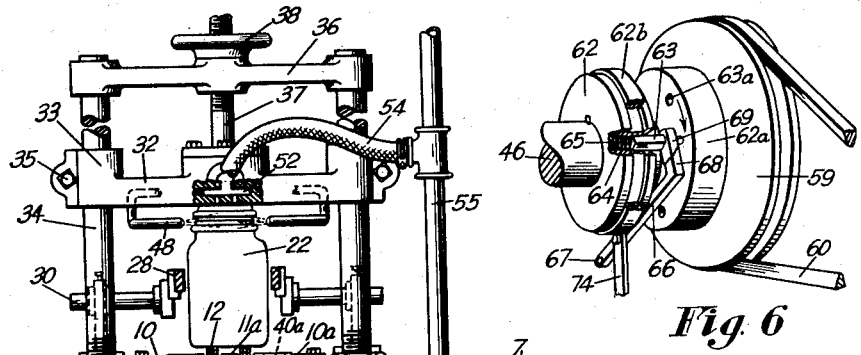
Figure 6 is a perspective view of clutch mechanism which I provide on my machine.

The clutch unit 61 is illustrated best in Figures 5 and 6 and comprises a disk-like portion 62a formed as a part of the fly wheel 59. This member 62a has a plurality of openings 63a formed in the face thereof at spaced points around the axis thereof. The clutch also comprises a disk-like portion 62 which is keyed on shaft 46 adjacent the fly wheel. The member 62 has a socket 64 formed in the face thereof which receives an outwardly extending square pin 63. A spring 65 normally forces this pin outwardly so that its outer end will contact with the face of the member 62a and will snap into one of the openings 63a. When the pin 63 is in one of the openings 63a, the members 62 and 62a will be clutched together. This will cause rotation of the cam 45. However, I provide means for normally keeping the pin 63 in such a position that it will not project into any of the openings 63a. Thus, the cam 45 will not normally be rotated.

This means comprises a lever 66 which is disposed between members 62 and 62a and which is pivoted to a suitable support as at 67. This member 66 has a wedge portion 68 carried thereby which normally engages a wedge portion 69 on the pin 63 to force the pin into the socket 64 as far as possible so that the end of the pin will not project into any of the openings 63a. For normally keeping the lever in this position there is provided a compression spring 70 which has its outer end surrounding a projection 71 formed on the lower edge of the member 66 adjacent the inner end thereof. The lower end of this spring fits into a socket 72 formed in a supporting member 73 in alignment with the space between members 62 and 62a. The member 73 is carried by the support 47.

As previously indicated, it is desirable for the cam 45 to rotate and to raise the platform 10a when a container with a cap thereon moves beneath the plate 32 of the sealing head unit. To accomplish this, I provide means for swinging lever 66 downwardly and allowing the pin 63 to enter one of the openings 63a in order to clutch members 62 and 62a together. This means comprises a link structure 74, the length of which is adjustable, which has its upper end pivotally connected to member 66 as at 75. The lower end of this link 74 is connected to the diaphragm (Figure 3) of the diaphragm unit 77. The unit 77 is connected by a vacuum line 55a to the line 55. Connected to the line 55a is a valve 78 which, when opened, will allow air to enter the lines 55a and 55. The stem 79 of this valve may be moved downwardly to open the valve by means of a pivoted lever 80. This lever 80 is moved downwardly at the proper time by a cam 81 which is in engagement therewith. This cam 81 is keyed on the shaft 46.

When a container with a cap thereon moves beneath plate 32 of the sealing head unit, the vacuum force exerted through openings 53 will lift the cap against plate 32 and close openings 53. Prior to the time the cap is lifted, the clutch unit will be inoperative so that the cam 45 will not rotate. Also the cam 81 will not rotate but will be in the position indicated in Figure 4 so that valve 78 will be closed. However, closing of openings 53 by the lifted cap will cause the vacuum pump to develop sufficient pressure in the lines 55 and 55a to flex the diaphragm 76 downwardly which will cause the links 74 to swing lever 66 downwardly and allow pin 63 to move outwardly into contact with the face of member 62a, which will be rotated, and finally into one of the openings 63a in member 62a. This will clutch the members 62a and 62 together and will cause rotation of cam 45 which will raise the platform 10a to force the container up into the cap and seal the cap on the container. When the cam 45 is rotated the cam 81 is also rotated. These cams are so arranged relative to each other that at the time the cam 45 starts to raise the platform 10a, the cam 81 will serve to swing the lever 80 downwardly, opening valve 78 and allowing air to enter lines 55a and 55. This will permit upward flexing of diaphragm 76 to its original position, allowing spring 70 to return lever 66 to its initial position where it will be in position to engage member 69, after member 62 completes one revolution, and force the pin 63 from opening 63a, disengaging the clutch. Thus, the clutch will be rendered inoperative and further rotation of the cams 45 and 81 will be precluded. The platform 10a will at this time be in its lowermost position. Also at this time, the cam 81 will have rotated sufficiently to permit the lever 80 to be in its original position, closing valve 78. The member 62 has a brake unit 62b associated therewith which always frictionally engages member 62 to prevent free rotation thereof and of shaft 46. The next time a container with a cap thereon moves beneath the plate 32, the control mechanism for lifting the container from the conveyer will function in exactly the same manner.

From the preceding description the operation of the entire machine will be well understood. The conveyer will be driven continuously and the sealing head unit 4 and the cap feeding and applying unit 3 will be properly adjusted to accommodate the containers and caps to be used. The containers will be placed freely and indiscriminately on the conveyer which will move them between the guides 28 so that they will be in alignment with the cap applying unit and the sealing head unit. After the caps are loosely applied thereto by the unit 3, the containers will be moved beneath the sealing head unit. Each time a container with a cap thereon moves beneath this unit, the control system will be automatically actuated to cause the platform 10a to be raised, lifting the container from the conveyer and causing the cap, which has been previously drawn up into contact with plate 32, to be sealed on the upper end of the container. However, before this sealing operation occurs, the upper end of the container and the cap are sterilized and the air is displaced from the upper end of the container. This is accomplished by the steam jets 48. I preferably employ low velocity steam so as not to entrain air. As previously described, when the container with a cap thereon reaches the plate 32, the cap is lifted therefrom in the manner illustrated in Figure 7, allowing the steam to enter into the upper end of the container.

In sealing the cap on the container, forcing of the rubber gasket over the upper end of the container in itself serves to hold the cap on the container. However, the condensation of the steam trapped in the head space in the container beneath the cap, which occurs immediately, produces a partial vacuum which is the main force serving to hold the cap on the jar and which also aids in preventing spoilage of the contents of the container. Immediately after the sealing action, the container is lowered until it again rests on the continuously moving conveyer and is moved away from the sealing position. As previously stated, the container lifting mechanism will not function if a container which has no cap thereon passes therebeneath. Also excessive sealing pressure will not occur even if a container of unusual height is encountered. This will prevent crushing of the container.

It will be apparent from the above description that I have provided a greatly simplified method and apparatus for applying and sealing closures on containers. The caps are first positioned on the containers loosely, are then lifted and the upper portion of the containers vacuumized and sterilized and simultaneously the caps are sterilized, and then the caps are forced into sealing engagement with the container. The containers will be vacuumized and sealed quickly and effectively. The machine is very simple and can be built at a comparatively low cost. It can be adjusted readily to operate upon containers of various sizes.

Many other advantages will be apparent from the preceding description, the drawings and the following claims.

Having thus described my invention, what I claim is:

1. Apparatus of the type described for closing and sealing open-mouth containers, comprising means for applying a closure loosely on the open mouth of a container, vacuum operated means for lifting the closure from the container, means for introducing steam into the container when the closure is lifted therefrom, means for forcing the closure on the container, said last-named means being actuated by said means for lifting the closure from the container.

2. Apparatus of the type described for closing and sealing open-mouth containers having caps loosely resting on the upper ends thereof, vacuum operated means for lifting the cap from each container, means for introducing steam into the container when the cap is lifted therefrom, means for forcing the cap on the container, said last-named means being actuated by said means for lifting the cap from the container.

3. Apparatus of the type described for closing and sealing open-mouth containers having caps loosely resting on the upper ends thereof, vacuum operated means for lifting the cap from each container, means for displacing air from the container when the cap is lifted therefrom, means for forcing the cap on the container, said last-named means being controlled by said means for lifting the cap from the container.

4. Apparatus of the type described for closing and sealing open-mouth containers having caps loosely resting on the upper ends thereof, vacuum operated means for lifting the cap from each container, and means for forcing the cap on the container, said last-named means being controlled by said means for lifting the cap from the container.

5. Apparatus of the type described for closing and sealing open-mouth containers having caps loosely resting on the upper ends thereof, comprising a conveyer for supporting the containers, a sealing head unit disposed above the conveyer, said sealing head unit having vacuum operated means associated therewith for lifting the cap from each container as it moves beneath the sealing head unit into contact with the sealing head unit, and means for lifting the container from the conveyer into association with the sealing head unit to cause said cap to be forced thereon, said last-named means being under the control of said means for lifting the cap from the container.

6. Apparatus of the type described for closing and sealing open-mouth containers having caps loosely resting on the upper ends thereof, comprising a conveyer for supporting the containers, means for moving said conveyer continuously, a sealing head unit disposed above the conveyer, said sealing head unit having vacuum operated means associated therewith for lifting the cap from each container as it moves beneath the sealing head unit into contact with the sealing head unit, a member associated with the conveyer directly below the sealing head unit, and means for moving said member upwardly relative to the conveyer to lift the container from the conveyer into association with the sealing head unit to cause said cap to be forced thereon, said last-named means being under the control of said means for lifting the cap from the container.

7. Apparatus of the type described for closing and sealing open-mouth containers having caps loosely resting on the upper ends thereof comprising a conveyer for supporting the containers, means for moving said conveyer continuously, a sealing head unit disposed above the conveyer, said sealing head unit having vacuum operated means associated therewith for lifting the cap from each container as it moves beneath the sealing head unit into contact with the sealing head unit, a vertically movable platform associated with the conveyer directly below the sealing head unit, means for moving said platform upwardly relative to the conveyer to lift the container from the conveyer into association with the sealing head unit to cause said cap to be forced thereon, said last-named means including a clutch, said clutch being under the control of said means for lifting the cap from the container.

8. Apparatus of the type described for closing and sealing open-mouth containers having caps loosely resting on the upper ends thereof comprising a conveyer for supporting the containers, means for moving said conveyer continuously, a sealing head unit disposed above the conveyer, said sealing head unit having vacuum operated means associated therewith for lifting the cap from each container as it moves beneath the sealing head unit into contact with the sealing head unit, a vertically movable platform associated with the conveyer directly below the sealing head unit, means for moving said platform upwardly relative to the conveyer to lift the container from the conveyer into association with the sealing head unit to cause said cap to be forced thereon, said last-named means including a cam, means including a clutch for controlling rotation of said cam, vacuum means for controlling said clutch, said vacuum means being under the control of said means for lifting the cap from the container.

9. Apparatus of the type described for closing and sealing open-mouth containers having caps loosely resting on the upper ends thereof comprising a conveyer for supporting the containers, means for moving said conveyer continuously, a sealing head unit disposed above the conveyer, said sealing head unit having vacuum ports associated therewith by means of which the cap is lifted from each container as it moves beneath the sealing head unit, a vacuum line connected to said ports, a vertically movable platform associated with the conveyer directly below the sealing head unit, means for moving said platform vertically relative to the conveyer to lift the container from the conveyer into association with the sealing head unit to cause said cap to be forced thereon and then to lower the capped container on the conveyer, said last-named means including a cam, means including a clutch for controlling rotation of said cam, a vacuum operated diaphragm unit for controlling said clutch and being connected to said vacuum line, said unit functioning to engage the clutch only when the cap is lifted from the container into association with the sealing head unit by means of said vacuum ports.

10. Apparatus of the type described for closing and sealing open-mouth containers having caps loosely resting on the upper ends thereof comprising a conveyer for supporting the containers, means for moving said conveyer continuously, a sealing head unit disposed above the conveyer, said sealing head unit having vacuum ports associated therewith by means of which the cap is lifted from each container as it moves beneath the sealing head unit, a vacuum line connected to said ports, a vertically movable platform associated with the conveyer directly below the sealing head unit, means for moving said platform vertically relative to the conveyer to lift the cap from the conveyer into association with the sealing head unit to cause said cap to be forced thereon and then to lower the capped container on the conveyer, said last-named means including a cam, means including a clutch for controlling rotation of said cam, a vacuum operated diaphragm unit for controlling said clutch and being connected to said vacuum line, said unit functioning to engage the clutch only when the cap is lifted from the container into association with the sealing head unit by means of said vacuum ports, means for breaking the vacuum, after it acts on said diaphragm unit to engage the clutch, in order to disengage the clutch, said means comprising a valve located in the vacuum line for permitting air to enter thereinto, said valve being under control of a cam which rotates with said first cam.

WILLIAM D. BELL.